Jan. 1, 1929.
F. O. ALBERTSON
1,697,447
CHUCK
Filed Aug. 11, 1926
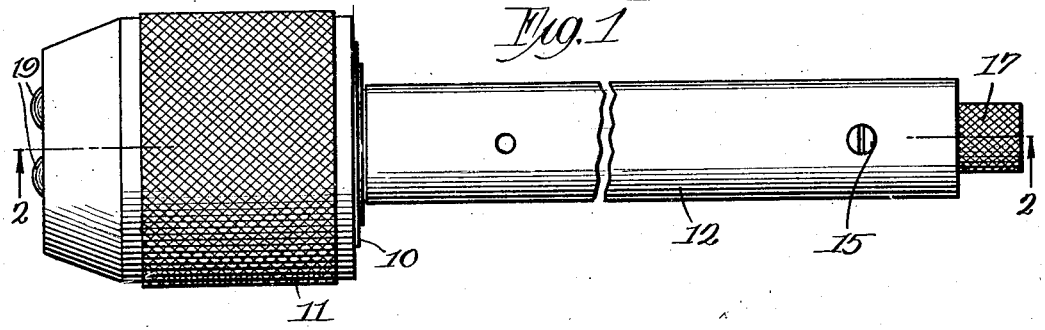
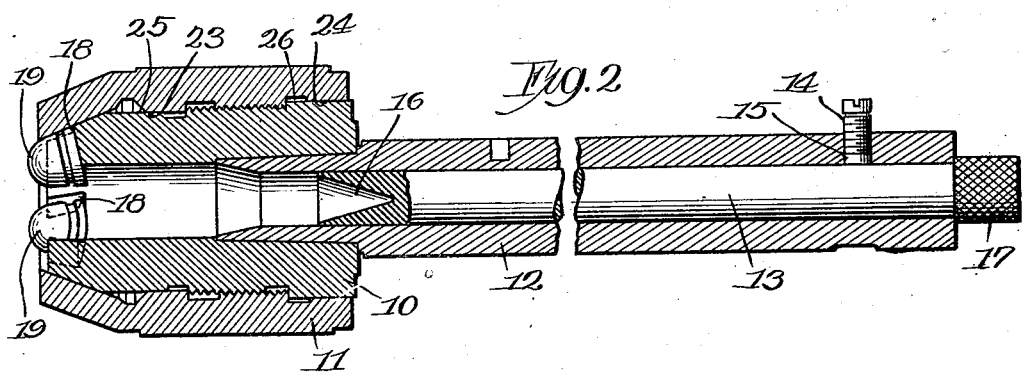
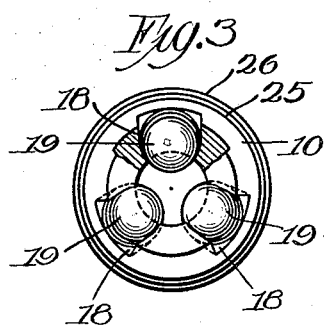
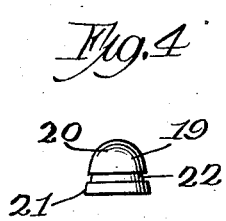
Inventor
Frans O. Albertson
By Williams, Bradbury, McCaleb & Hinkle
Attys.

Patented Jan. 1, 1929.

1,697,447

UNITED STATES PATENT OFFICE.

FRANS O. ALBERTSON, OF SIOUX CITY, IOWA, ASSIGNOR TO ALBERTSON & COMPANY, INC., OF SIOUX CITY, IOWA, A CORPORATION OF IOWA.

CHUCK.

Application filed August 11, 1926. Serial No. 128,540.

My invention relates to chucking devices and has for its particular object the provision of an improved type of chuck particularly for use in grinding machines, although its use is not thus limited and the salient features of the invention may be employed in chucks for general use, as in drill presses, lathes and similar tools.

A further object is to provide an improved chuck in which the jaws are of an improved durable construction whereby the piece being held is accurately centered and firmly gripped.

A further object is to provide improved means for aligning and centering the tool in the chuck.

A further object is to provide an improved chuck which is simple in construction, easily operable and which may be economically manufactured.

Other objects will appear in the following description, reference being had to the accompanying drawings in which, Fig. 1 is a plan view of the chuck.

Fig. 2 is a vertical sectional view taken on the line 2—2 of Fig. 1.

Fig. 3 is a fragmentary end elevation of the body portion of the chuck, and

Fig. 4 is a detailed view of one of the jaws.

Referring particularly to the drawings, the chuck comprises a body 10 over which a sleeve 11 is threaded. A tubular shaft 12 is pressed into the body 10 although if desired the body 10 and tubular shaft 12 may be made integral. An aligner 13 is freely slidable within the tubular shaft 12 and may be secured in adjusted position by means of a set screw 14, a copper disc 15 being provided to prevent the set screw from marring the surface of the aligner 13. The inner end of the aligner 13 has a conical recess 16 which serves as means to automatically center the end of the piece to be held. The outer end of the aligner has an enlarged head 17 which is knurled for easy manipulation.

Three equally spaced radial slots 18, cut in the end of the body 10 serve as guides for the jaws 19. These slots are wider at their bottoms than at their tops, and are narrowed toward the center of the body so as to prevent the jaws from falling from the slots when the piece to be held has been removed from the chuck. The bottoms of these slots slope rearwardly toward the center, as is best shown in Fig. 2.

Each of the jaws 19 comprises a substantially hemispherical crown portion 20 and a frusto-conical portion 21 separated from the crown by a circumferential groove 22. The crown portion has a frusto-conical zone extending for a short distance from the groove 22.

The jaws 19 are made with a rounded or substantially hemispherical crown portion 20 in order that they may be easily cammed apart by the shank of a tool or a valve stem. The frusto-conical sufaces of the jaws are adapted to clamp a shank in accurate axial position but these surfaces are not subject to the wear as in the case of a ball-shaped jaw. Thus the jaws are adapted to maintain their accurate position and to clamp shanks axially for long periods of service, the jaws possessing all of the advantages of ball-shaped jaws without the usual disadvantage of being subject to wear which will diminish the accuracy of alignment.

When positioned in the slots 18 the jaws 19 each have the element of their frusto-conical surfaces which lies nearest the axis of the body 10 in parallelism with said axis. Thus when a cylindrical piece is inserted each of the jaws will have a line of contact with its surface.

The end of the body 10 is frusto-conical and the adjacent end of the sleeve 11 is complementally tapered so that by rotating the sleeve on the body the jaws will be cammed inwardly equal distances to center and securely clutch the piece. The groove 22 divides the frusto-conical piece engaging surfaces of the jaw and thus improves the clutching power of the jaw.

The sleeve 11 is maintained in accurate coaxial alignment with the body 10 through the engagement of the bearing surfaces 23 and 24 of the former with the cylindrical surfaces 25 and 26 respectively of the latter.

The operation of the chuck is very simple. The sleeve 11 is turned so as to move to the left (Figs. 1 and 2) relative to the body 10. The piece to be chucked is then inserted, the jaws 19 being forced outwardly. The inward movement of the piece may, if desired, be limited by the aligner 13, which through its conical recess 16 will accurately center the end of the piece. In chucking a plurality of similar pieces in succession, the aligner may be properly adjusted and set by means of the set screw 14 and thus the pieces will each be automatically centered and stopped in the desired position. The sleeve may then be screwed upon the body. The tapered portion will thereupon cam the jaws inwardly and very accurately center and clutch the piece.

The chuck of my invention is designed particularly for use with valve grinding machines, where in chucking the stems of the valves its advantages are most apparent. The jaws have a comparatively long line of contact with the stem so that even if great pressures are exerted upon them they will not pit or mar the surface of the stem. The fact that the jaws make a line contact instead of a point contact as is usual in most ball-type chucks, tends to extend the life of the jaws. The chuck of my invention has the advantages of a ball-type chuck without its attendant disadvantages.

While I have disclosed a particular embodiment of my invention, it will be apparent to those skilled in the art that slight variations may be made without departing from the principles of the invention. I do not wish to limit the scope of my invention except as required by the following claims.

I claim:

1. A chuck comprising an externally threaded body having a cylindrical bearing surface on each side of the threaded portion, a sleeve adapted to be threaded over said body and having complementary bearing surfaces engaging said cylindrical surfaces to hold said sleeve in axial alignment with said body, a plurality of jaws having frusto-conical clutching surfaces and hemispherical crowns, said jaws being retained and guided in radial slots in said body, and an inwardly tapered cam surface on the end of said sleeve adapted to force said jaws inwardly upon axial movement of said sleeve relative to said body.

2. In a chuck, an externally threaded body having an axial bore extending through the same, and a plurality of radial grooves in one end, a plurality of jaws having frusto-conical surfaces and hemispherical ends, slidably supported in said grooves and projecting therefrom with an element substantially parallel to the axis of said bore, a threaded sleeve having an inner frusto-conical surface adapted to cam said jaws inward, and aligning means comprising a member having a conical aperture in the same, said member being adjustably supported in the other end of said bore.

3. A chuck comprising an externally threaded body, having an axial bore extending through the same, a cylindrical bearing surface on each side of said threads, and a plurality of radial slots in one end, the bottoms of said slots sloping radially and inwardly away from said end, a plurality of jaws having hemispherical ends and frusto-conical surfaces, slidably mounted in said slots and having plane surfaces engaging the bottoms of said slots, said frusto-conical surfaces having a portion of the same cut away so as to form a plurality of separate surfaces having sharp edges, a sleeve threaded over said body and having complementary bearing surfaces to engage with said cylindrical surfaces, said sleeve having a tapered inner surface adapted to cam said jaws inwardly, and an aligning rod having a conically shaped aperture in one end, adjustably and slidably supported in the other end of said bore.

4. In a chuck, the combination of a body having a bore extending into the same with a plurality of jaws supported for radial sliding movement in grooves in the end of said body, said jaws comprising relatively short frusto-conical members having rounded outer ends and flat bases, and said grooves having flat bottoms at such an angle to the axis of said chuck that said bottoms are adapted to slidably support said jaws with an element of the frusto-conical surface of each parallel to the axis of said chuck.

5. In a chuck, the combination of a body having a bore extending into the same with a plurality of jaws supported for radial sliding movement in grooves in the end of said body, said jaws comprising relatively short frusto-conical members having rounded outer ends and flat bases, and said grooves having flat bottoms at such an angle to the axis of said chuck that said bottoms are adapted to slidably support said jaws with an element of the frusto-conical surface of each parallel to the axis of said chuck, and an acutely conical aligning member carried by said chuck and spaced from said jaws.

6. In a chuck, the combination of a body having a bore extending into the same with a plurality of jaws supported for radial sliding movement in grooves in the end of said body, said jaws comprising relatively short frusto-conical members having rounded outer ends and flat bases, and said grooves having flat bottoms at such an angle to the axis of said chuck that said bottoms are adapted to slidably support said jaws with an element of the frusto-conical surface of each parallel to the axis of said chuck, and a sleeve having an inner frusto-conical surface for engaging said jaws and camming said jaws inward, said sleeve and said body having complementary threaded surfaces and complementary contacting aligning surfaces.

7. A chuck comprising an externally threaded body, having an axial bore extending through the same, said body having a pair of cylindrical bearing surfaces on the same spaced a substantial distance from each other, a sleeve adapted to be threaded over said body and having complementary bearing surfaces adapted to engage said cylindrical surfaces and hold said sleeve in accurate axial alignment with said body, means carried in one end of said body for clamping the shank of a tool, and means carried in the other end of said body for supporting the end of said shank.

8. A chuck comprising an externally threaded body, having an axial bore extending through the same, and having a plurality of radial slots in one end, the bottoms of said slots sloping radially and inwardly from said end, a plurality of jaws having frusto-conical surfaces, slidably mounted in said slots, said bottoms and said jaws having engaging plane surfaces at such an angle to the axis of the chuck that an element of each of said frusto-conical surfaces is parallel to the axis of said bore, a sleeve threaded over said body and having a frusto-conical inner surface adapted to cam said jaws inwardly, and means carried adjacent the other end of said body to align a tool held in said jaws.

9. In a chuck, a supporting body having an elongated bore extending entirely through the same, an elongated rod projecting from one end of said bore and terminating in an internal, conical, tool-centering surface of acute angularity, means supported by said body adjacent the other end of said bore to clamp the shank of a tool, said rod being axially adjustable relative to said clamping means and means for securing said rod in any adjusted position.

10. In a chuck, a body having an axial bore extending into the same and a plurality of radial grooves in one end, a plurality of jaws having frusto conical surfaces and hemispherical ends slidably supported in said grooves and projecting therefrom with a part parallel to the axis of said bore, a sleeve having a tapered inner surface adapted to cam said jaws inwardly, means for moving said sleeve axially of said body, and aligning means comprising a rod having a conical, tool-centering surface of acute angularity, said rod positioned in said bore and axially adjustable relative to said jaws, and means for securing said rod in any adjusted position.

In witness whereof, I hereunto subscribe my name this 4th day of August, A. D., 1926.

FRANS O. ALBERTSON.